C. W. NIXON.
LOCK FOR AUTOMOBILES.
APPLICATION FILED JULY 23, 1919.
1,348,891.
Patented Aug. 10, 1920.
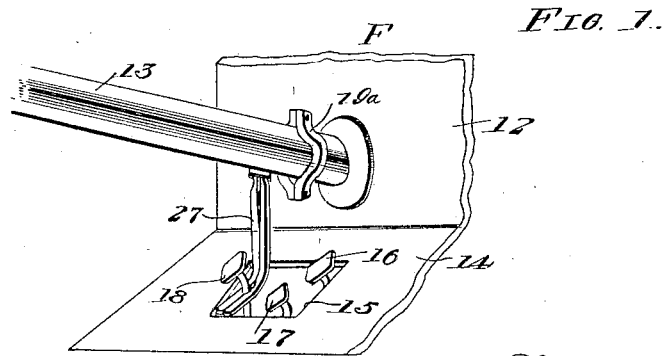
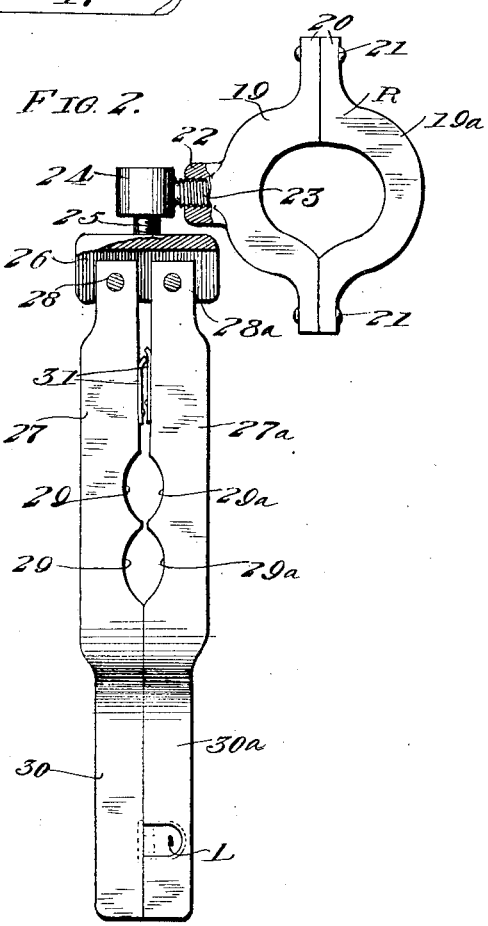
WITNESSES
INVENTOR
C. W. NIXON,
BY
ATTORNEYS

UNITED STATES PATENT OFFICE.

CHARLES WILLIAM NIXON, OF NEW ORLEANS, LOUISIANA.

LOCK FOR AUTOMOBILES.

1,348,891.   Specification of Letters Patent.   Patented Aug. 10, 1920.

Application filed July 23, 1919. Serial No. 312,695.

*To all whom it may concern:*

Be it known that I, CHARLES W. NIXON, a citizen of the United States, and a resident of New Orleans, in the parish of Orleans and State of Louisiana, have made certain new and useful Improvements in Locks for Automobiles, of which the following is a specification.

My invention relates to locks for automobiles, and particularly to a device for locking one of the operating pedals of a Ford automobile in a position to prevent theft of the machine.

An object of my invention is the provision of a locking device of the above described character, which effectively locks a clutch pedal in neutral position, such device after being once attached forming an integral part of the machine, and constructed to prevent the prying or bending apart of any part of the device, in an attempt to remove the same from the pedal.

I will describe one form of locking device embodying my invention, and will then point out the novel features thereof in claims.

In the accompanying drawing:

Figure 1 is a fragmentary view of a portion of a Ford automobile having applied thereto one form of locking device embodying my invention;

Fig. 2 is a view showing in front elevation and partly in section, the locking device shown in Fig. 1.

Similar reference characters refer to similar parts in each of the several views.

Referring specifically to the drawing, and particularly to Fig. 1, F designates generally a Ford automobile including the dash 12, in which projects a steering post 13, and the floor 14, formed with an opening 15 through which project the operating pedals 16, 17 and 18. As illustrated to advantage in Fig. 2, the locking device embodying my invention comprises a clamping ring R which consists of two semi-circular sections 19 and 19ª having flanges 20 formed on the confronting edges and secured together by rivets 21. As shown in Fig. 1, the ring R is adapted to embrace the steering post 13, and is designed to remain permanently upon the steering post after it is once applied. This is effected by means of the rivets 21. The section 19 is formed with an annular projection 22, the inner wall of which is screw-threaded to receive a stud 23 formed on the collar 24. The collar 24 is interiorly threaded to receive a stud 25, which is carried by a yoke 26. From this arrangement it will be seen that the ring R and the yoke 26 have a universal connection, so that either of which may be moved to any desired position.

As shown in Fig. 2, the yoke 26 is of substantially U-shaped formation and carries gripping arms 27 and 27ª, which are pivotally secured between the parallel portions of the yoke by means of pins 28 and 28ª, respectively. The confronting edges of the arms 27 and 27ª are provided at corresponding points with recesses 29 and 29ª, the recesses of each pair coacting to provide a space for receiving one of the operating pedals shown in Fig. 1. At a point below the recesses 29 and 29ª, the arms are bent rearwardly so that when in applied position, these bent portions lie substantially flush with the floor 14 of the vehicle. The bent portions are indicated at 30 and 30ª, as shown in Fig. 2 and are recessed to accommodate the two portions of a permutation lock L, preferably of the pin type. To effect the quick release of an operating pedal from the locking device, the arms 27 and 27ª are biased outwardly by means of leaf springs 31, which as shown in Fig. 2, are arranged on the confronting edges of the arms, and contact with each other when the arms are in locked position.

In Fig. 1, I have shown the locking device applied to the clutch pedal 18 of the vehicle, in such manner that the pedal is locked in neutral position. It will be understood that the pedal arm is disposed within either pair of recesses 29, and that the arms 27 and 27ª are locked in embracing position by means of the lock L. When it is desired to release the clutch pedal 18, the lock L is open, thus allowing the arms to swing apart under the action of the springs 31. By virtue of the universal connection between the ring R and the yoke 26, the arms 27 and 27ª can be moved to any desired position, so that they will not interfere with the normal operation of the pedals. The arms are preferably supported in a suitable hanger (not shown), which may be mounted either on the dash 12 or the steering post 13.

All of the parts of the locking device are preferably made of case hardened steel, so as to prevent sawing of the parts to effect an unauthorized releasing of the locking device. It will be noted that as a further precaution against the surreptitious opening of the lock, the elements constituting the same are so associated with the pedal and steering post that the insertion of a tool between the elements to effect distortion of the same and consequent releasing of the device is prevented.

Although I have herein shown and described only one form of locking device embodying my invention, it is to be understood that various changes and modifications may be made herein without departing from the spirit of the invention and the spirit and scope of the appended claims.

Having described my invention, what I claim is:—

1. A locking device, comprising a ring formed of sections riveted together, an annular projection on one of the sections, a collar, a stud fixed to the collar and threadedly engaging said projection, a yoke, a stud formed on the yoke and threadedly engaging the interior of said collar, a pair of gripping arms pivoted to the yoke and formed at corresponding points on the confronting edges thereof with recesses, springs on the confronting edges of said arms for biasing the latter away from each other, and a lock having coacting portions carried by the arms and adapted to lock the arms together against the tension of said spring.

2. In combination, a steering post, a sectional ring embracing the steering post, a yoke, a collar movably connected to the yoke, said ring being movably connected to said collar, a pedal, a pair of gripping arms pivotally connected to said yoke and adapted to embrace said pedal, means for biasing the arms out of engagement with said pedal, and means carried by the arms for locking the same in embracing position.

CHARLES WILLIAM NIXON.